B. S. TRUXAL.
REVERSING GEARING.
APPLICATION FILED OCT. 17, 1907.
929,520.
Patented July 27, 1909.
2 SHEETS—SHEET 1.
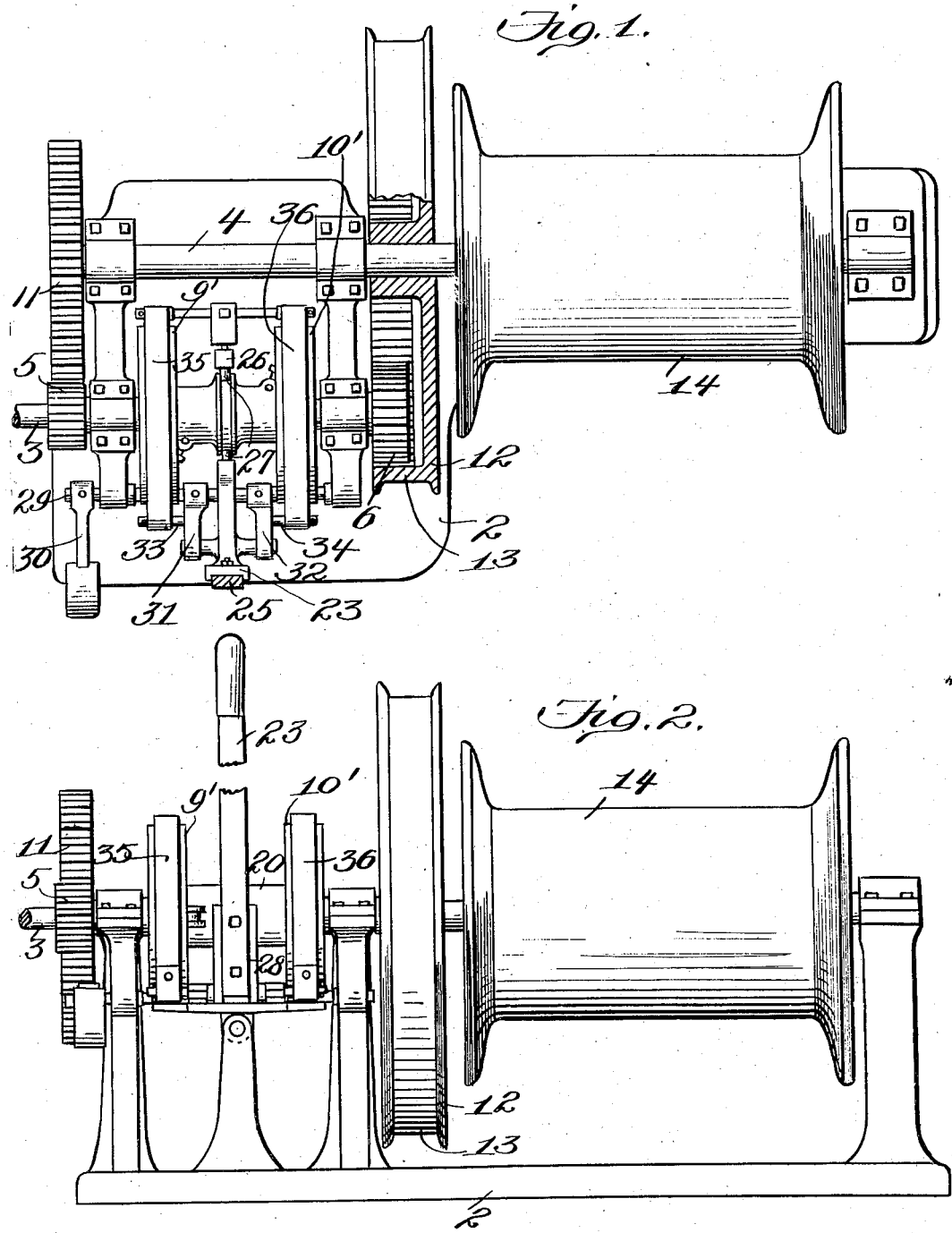
Witnesses:
Inventor
Benjamin S. Truxal
By James L. Norris
Atty

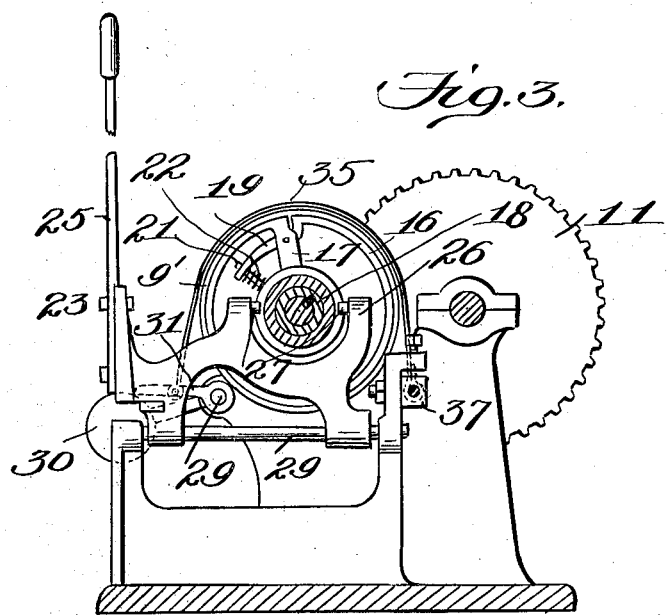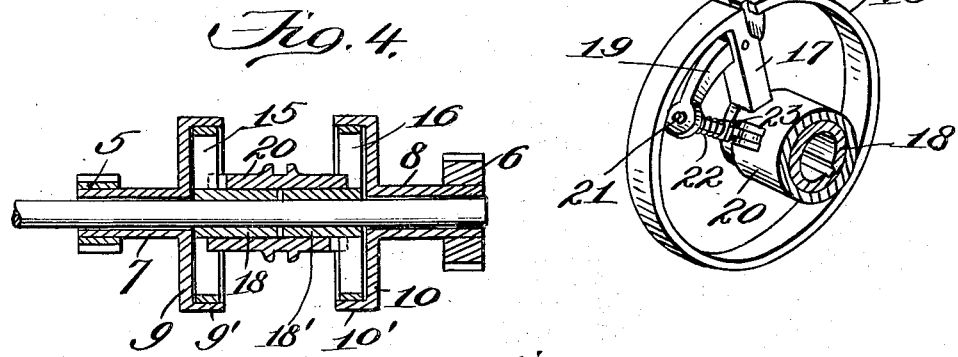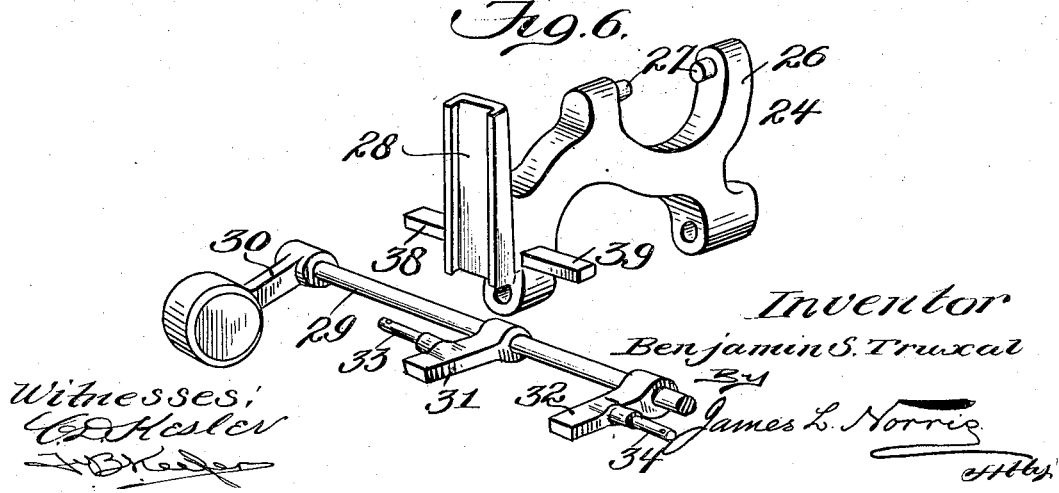

UNITED STATES PATENT OFFICE.

BENJAMIN S. TRUXAL, OF CHATTANOOGA, TENNESSEE.

REVERSING-GEARING.

No. 929,520.      Specification of Letters Patent.      Patented July 27, 1909.

Application filed October 17, 1907. Serial No. 397,844.

*To all whom it may concern:*

Be it known that I, BENJAMIN S. TRUXAL, a citizen of the United States, residing at Chattanooga, in the county of Hamilton and State of Tennessee, have invented new and useful Improvements in Reversing-Gearing, of which the following is a specification.

This invention relates to reversing gearing. I can utilize such gearing in many different ways, one of which is in connection with a vertically movable car or platform such as that employed for carrying materials and the like from the ground to the upper portion of a building during the construction of the latter. Said reversing gearing comprises two pairs of gears, one pair of gears having a circumferential engagement and one gear of the other pair engaging the companion gear internally thereof. These pairs of gears are preferably carried by independent shafts and in the present case one gear of each pair is carried by what might be considered the primary shaft of the apparatus, while the other gears are carried by what might be considered the secondary shaft of the apparatus. Preferably the primary shaft is power driven and, by alternately putting the gears thereon into driving relation therewith, the secondary shaft can be driven alternately in opposite directions. I use the terms "primary" and "secondary" simply for convenience of illustration; in the present case the primary shaft is the driving shaft, while the secondary shaft is the driven shaft. These conditions, however, might be reversed. By virtue of the organization outlined I can reverse the movement of the secondary or driven shaft whether the same be in one or more sections without the necessity of changing the motion of the primary or driving shaft. While the two gears carried by the primary or driving shaft may be of any suitable character, I find that I can with advantage employ toothed gears for this purpose, the secondary or driven shaft also carrying toothed gears meshing with those on the primary or driving shaft, it being clear that one toothed gear internally engages the complemental toothed gear, the other toothed gears having a peripheral engagement. The primary or driving gears are alternately coupled to the primary or driving shaft in some suitable way, and for this purpose I may employ clutch mechanism such as that covered in my co-pending application Serial No. 397,845, filed October 17, 1907.

In the drawings accompanying and forming part of this specification I have shown in full one effective embodiment of the invention which, to enable those skilled in the art to practice the same, will be set forth in detail in the following description, while the novelty of the invention will be included in the claims succeeding said description.

Referring to said drawings: Figure 1 is a top plan view of hoisting apparatus involving my invention, one of the gears being partially in section or broken away and the hand-lever being also in section. Fig. 2 is a front elevation of the apparatus. Fig. 3 is a transverse section of the same. Fig. 4 is a longitudinal sectional view of the clutch mechanism. Fig. 5 is a perspective view of a portion of the clutch mechanism. Fig. 6 is a detail view in perspective of a portion of the hand-lever and brake-setting device separated from each other.

Like characters refer to like parts throughout the several figures of the drawings.

The different parts of the apparatus may be sustained upon a bed or foundation plate as 2; and among these parts is a shaft as 3 which constitutes the main, primary, or driving shaft of the apparatus. This shaft 3 may be operated in any suitable way. In addition to the primary shaft 3 there is a secondary shaft as 4. These two shafts are sustained by suitable bearings rising from the bed or plate 2. In the present case the shaft 3 carries two pinions 5 and 6 which are loose with respect to said shaft 3, although they are fastened in some suitable way to the elongated hubs 7 and 8 of the wheels 9 and 10 respectively, which are loosely supported directly by said shaft 3. As will hereinafter appear the pinions 5 and 6 are adapted to be put into driving connection alternately with the shaft 3. The pinion 5 is shown as meshing with the gear 11. Both these gears 5 and 11 are peripherally toothed and their engagement therefore is a peripheral or circumferential one. The gear 6 coöperates with the gear 12. The gears 11 and 12 may be fastened to the driven or secondary shaft 4 in any desirable way. The gear 12 is shown as having a circumferential rim or flange 13 toothed on its inner side to engage with the teeth of the pinion 6; and it therefore follows that the gear 6 internally engages the gear 12. As the two gears 5 and 6 are loosely carried by the shaft 3 and as the two coöperating gears 11 and 12 are fastened to the shaft 4, it follows that, when the gear 5 is in action, the shaft 4 will be turned in one direction and that, when the gear 6 is in action, said shaft 4 will be turned in the opposite direction. Reversal of the motion of the shaft 4 can therefore be obtained without reversing the shaft 3. The gear 12 may be peripherally grooved to receive one or several turns thereon of a cable, band, or equivalent device, the branches of which may extend to an elevator or hoisting platform for the purpose of operating said elevator or hoisting platform from the shaft 4. The shaft 4 may also have fastened thereto a drum or spool 14 around which a cable may be wound, or two cables may be wound upon said drum or spool, one to be paid off and the other to be coiled thereabout on the turning of the shaft 4.

The wheels 9 and 10 constitute halves or sections of two clutches, the other sections thereof consisting of divided rings as 15 and 16 (see Figs. 4 and 5 for example.) In Fig. 5 the ring 15 and certain parts coöperative therewith are shown in detail and for this reason will now be specifically described. The resilient or spring ring 15 has at one end thereof the radial inwardly-extending arm 17 and with the same is connected an elongated hub 18 keyed or otherwise suitably fastened to the shaft 3. The arm 17 pivotally supports a lever as 19 the toe of which is adapted to engage the free end of the spring ring for the purpose of expanding the latter into frictional engagement with the marginal flange 9' of the wheel 9. When the ring 16 is expanded it engages the similar flange 10' of the wheel 10. The hub of the radial arm or ring 16 is designated by 18'. The two hubs 18 and 18', both of which as will be understood are fastened to the shaft 3, fit nearly end to end and slidingly support the sleeve 20 which moves oppositely from the neutral position which it is indicated as occupying in Fig. 4 for the purpose of alternately circumferentially expanding the two rings 15 and 16. To the opposite ends of the sleeve 20 are pivoted the inner ends of rods as 21, said rods extending outward from said sleeve and through perforations or slots in the tails of the two levers 19, as shown clearly in Fig. 5. Around said rods are coiled springs as 22 bearing against the tails of the levers 19 and against nuts as 23 adjustably fitted to said rods 21. When therefore the sleeve 20 is operated to expand either of the rings 15 or 16 a yieldable effect is applied to said rings from the sleeve 20 by virtue of the springs 22. When the sleeve 20 is in its intermediate position as shown in Fig. 4 neither of the rings 15 or 16 will engage the rims 9' or 10' by reason of the resiliency of said rings. By moving the sleeve 20 sufficiently far to the left in Fig. 4 it will be clear that the wheel 9 and therefore the pinion 5 will be clutched to the shaft 3. By moving said sleeve 20 to the right sufficiently far the wheel 10 and consequently the pinion 6 will be clutched to said shaft 3.

The handle for operating the sleeve 20 longitudinally of the shaft 3 is designated in a general way by 23 and it consists in the present case of a rocker as 24 (see Fig. 6) and a handle portion as 25 fastened to said rocker. The rocker 24 is supported by suitable bearings on the bed 2 which bed with said bearings constitutes the framework of the apparatus. The axis of motion of the rocker is shown as being transverse to the direction of motion of the sleeve 20. The rocker 24 is represented as having a yoke 26 the branches of which are provided with inwardly-disposed pins as 27 to enter a peripheral groove in the sleeve 20. When the hand-lever 23 stands vertically the sleeve 20 is in its intermediate or neutral position, and said lever is shown as being in said vertical position in both Figs. 2 and 3. The rocker 24 is provided with a vertical projection 28 channeled to receive the handle portion 25, the two parts being united in any desirable manner, for example, by bolts.

Supported by suitable bearings in the bed 2 is a rock-shaft as 29, said rock-shaft 29 constituting part of the brake-setting mechanism for the two wheels 9 and 10. This shaft 29 has fastened thereto the weighted arm 30 constituting a convenient means for automatically operating the shaft 29. In addition to said weighted arm 30 the shaft has fastened thereto two other arms as 31 and 32 and extending laterally from these arms 31 and 32 are pins as 33 and 34 to which are connected brake bands or straps as 35 and 36 respectively. The straps 35 and 36 surround the peripheries of the flanges or rims 9' and 10', respectively, and the ends thereof opposite those connected with the pins 33 and 34 are connected to vertically adjustable blocks as 37 (see Fig. 3 for example) by adjusting which wear in the two flanges or rims 9' and 10' may be taken up. The blocks 37 are normally stationary. The rocker 24 is shown as furnished with the lateral extensions 38 and 39 respectively coöperative with the rock-arms 31 and 32. The rock-arms 31 and 32 overlie the extensions 38 and 39 respectively. The weighted arm 30, acting through the rock-shaft 29, is what maintains the two brake bands 35 and 36 in their set condition, the hand-lever 23 and sleeve 20 at this time being in their neutral positions, while the arms 31 and 32 will be above but out of contact with the extensions 38 and 39. When therefore neither of the clutches hereinbefore described is in action the two brakes 35 and 36 are set. It will be assumed that the sleeve 20 is moved to the left to exband the ring 15 and thereby put the pinion 5 into driving relation with the shaft 3. This operation is accomplished by swinging the hand-lever 23 to the left in Fig. 2. When said hand-lever thus swings the extension or projection 38 will be lowered, while the extension 39 will be raised thereby causing said projection 39 to engage the arm 32 to lift the weighted arm 30 and thereby unset simultaneously the two brake bands 35 and 36, the two brake bands being unloosed fully when the ring 15 is clutched to the rim 9'. When the hand-lever 23 is returned to its central position to unclutch the ring 15 from the rim 9' the two brake bands 35 and 36 are simultaneously set by the dropping of the weighted arm 30. Should the hand-lever be swung to the right from its neutral position the projection or extension 38 will engage the arm 31 so as to simultaneously unset the two brake bands 35 and 36. The hand-lever 23 is positively maintained in its central or neutral position by the power of the two push springs 22.

What I claim is:

1. The combination of two pinions, wheels rotative with the respective pinions, means for simultaneously braking the two wheels, means for throwing said wheels alternately into driving relation with a source of power and for simultaneously relieving them from the action of the braking means, two gears one peripherally engaged by one of the pinions and the other internally engaged by the other of said pinions, and a shaft to which said gears are attached.

2. The combination of a pair of driving members, clutch means for alternately connecting said driving members with a source of power, means for controlling said clutch means, comprising a rocker, a brake coöperative with each driving member, and an automatically-operative brake-setting device for said brakes, said rocker being adapted to occupy a neutral position with both driving members out of coöperative relation with said source of power and during which it permits said brake-setting device to occupy an operative position, and being movable oppositely from said neutral position to cause the operation of said brake-setting device and the unsetting of said brakes.

3. The combination of a pair of driving members, clutch means to alternately connect said driving members with a source of power, means for operating the clutch members, comprising a rocker adapted to occupy a neutral position when both driving members are out of driving relation with said source of power, a rock shaft provided with a weighted arm and also provided with projections each of the latter equipped with a lateral extension, and band brakes coöperative with the respective driving members and one end of each being connected with one of said extensions, said rocker having lateral extensions to engage said projections.

4. The combination of a pair of driving members, clutch means for alternately connecting said driving members with a source of power, means for controlling said clutch means, including a movably mounted member, a brake coöperative with each driving member, and an automatically operative brake-setting device for said brakes, said movably mounted member being adapted to occupy a neutral position with both driving members out of coöperative relation with said source of power and during which it permits said brake-setting device to occupy an operative position and being movable oppositely from said neutral position to cause the operation of said clutch means and the unsetting of said brakes.

5. In reversing gearing of the type set forth, in combination, gear elements, a source of power, means for connecting any one of said elements in driving relation to the source of power, a rocking member engaged with said means to effect operation thereof, automatically operating braking means for the gear elements, including means for setting and releasing said braking means comprising a rock shaft, a weight thereon, and arms carried thereby and projecting therefrom, and arms carried by said rocking member for engagement with the arms on said rock shaft to operate the latter upon operation of said member, said rock shaft in its operation causing a setting or releasing of said braking means.

In testimony whereof I have hereunto set my hand in presence of two subscribing witnesses.

BENJAMIN S. TRUXAL.

Witnesses:
S. C. ELLIS,
H. B. HEYWOOD.